United States Patent [19]
Wolf

[11] 3,826,513
[45] July 30, 1974

[54] TRIPOD CARRIER

[76] Inventor: Leopold Wolf, 2320 Bermuda Ln., Hayward, Calif. 94545

[22] Filed: Nov. 29, 1973

[21] Appl. No.: 420,133

[52] U.S. Cl. ............ 280/79.1, 280/47.27, 280/47.13
[51] Int. Cl. .............................................. B62b 1/02
[58] Field of Search ........... 280/34 R, 35, 47.13, 64, 280/79.1; 182/16, 20, 21, 127

[56] References Cited
UNITED STATES PATENTS
466,899  1/1892  Bourell ............................ 182/20 X FOREIGN PATENTS OR APPLICATIONS
352,577  4/1961  Switzerland ................. 280/47.13 R

*Primary Examiner*—David Schonberg
*Assistant Examiner*—Michael J. Forman
*Attorney, Agent, or Firm*—Melvin R. Stidham, Esq.

[57] ABSTRACT

The disclosure is of a camera tripod and equipment transport including a panel of relatively rigid material which may be mounted across a pair of the legs of an erected tripod. The panel has a shelf with restraining means for a camera equipment container. Wheels are mounted on the panel whereby, with the third leg also releasably secured to the transport, the tripod may be tilted back and pulled along on the wheels.

6 Claims, 5 Drawing Figures

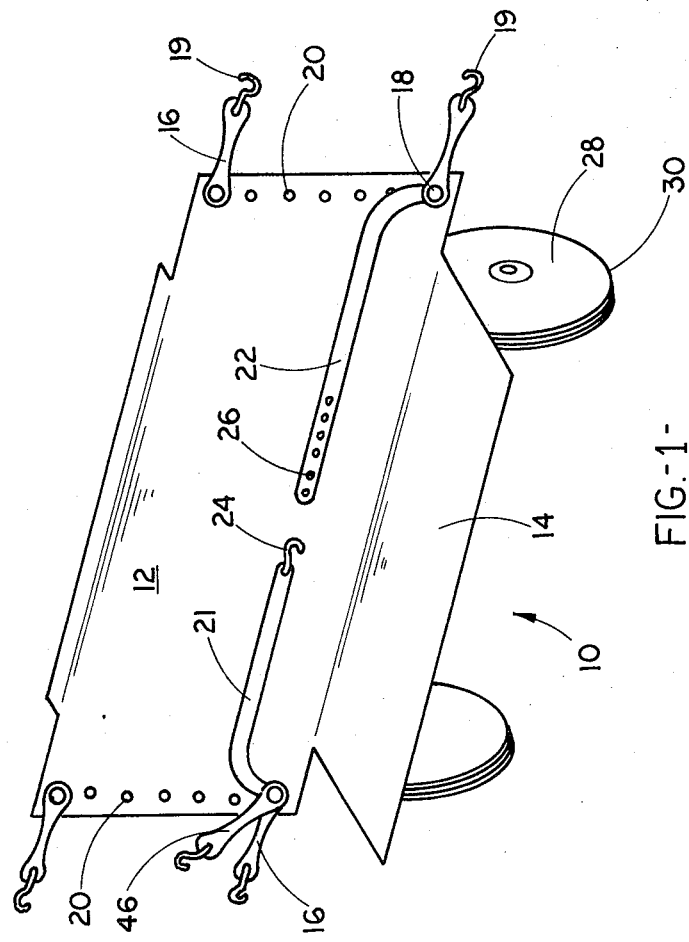
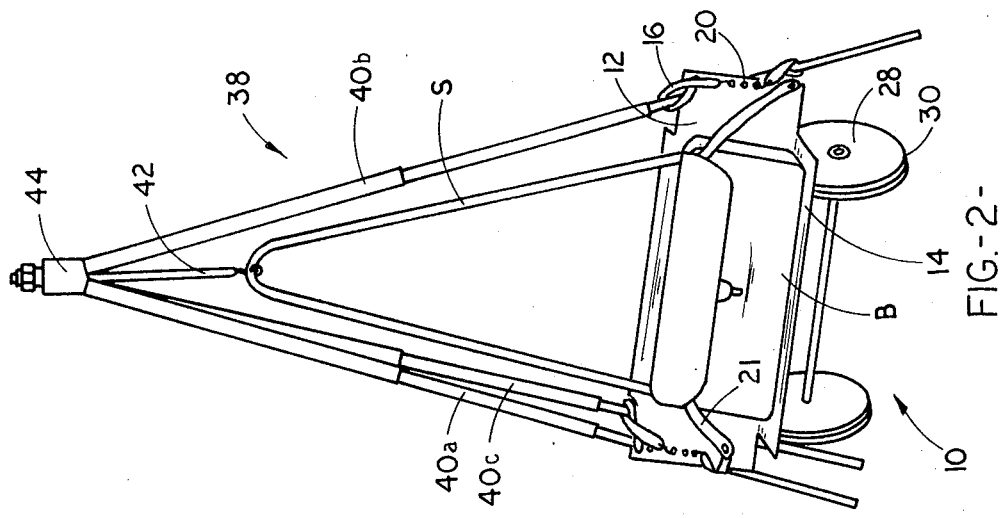

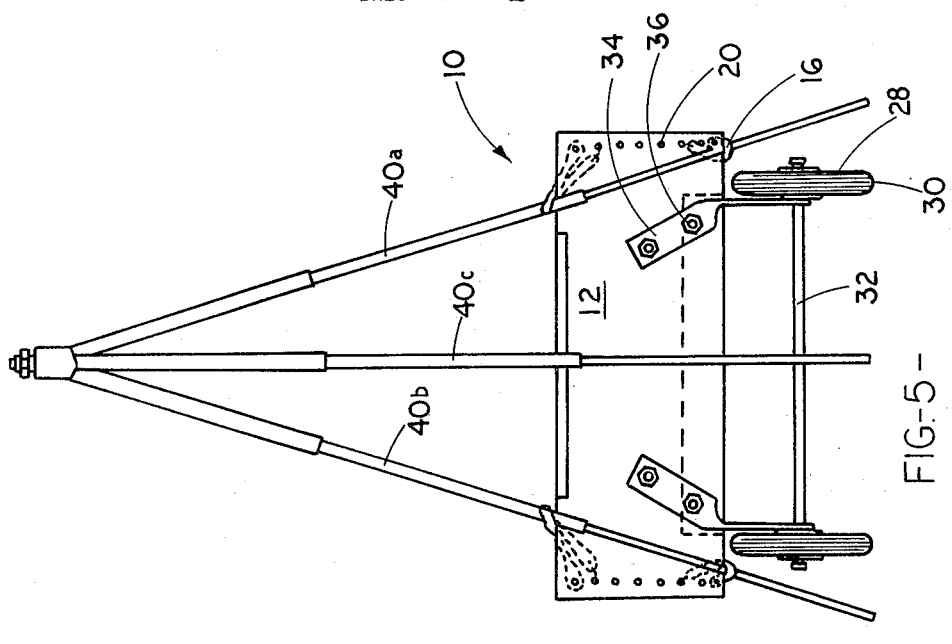
FIG.-5-
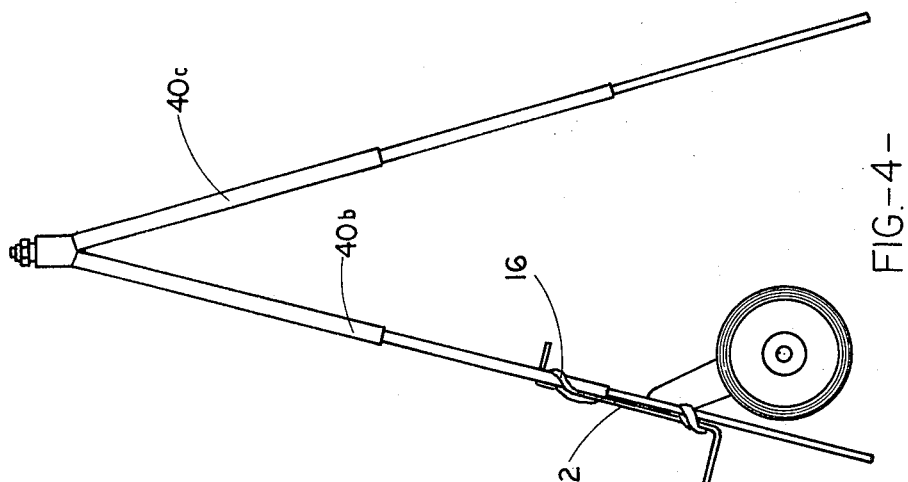
FIG.-4-
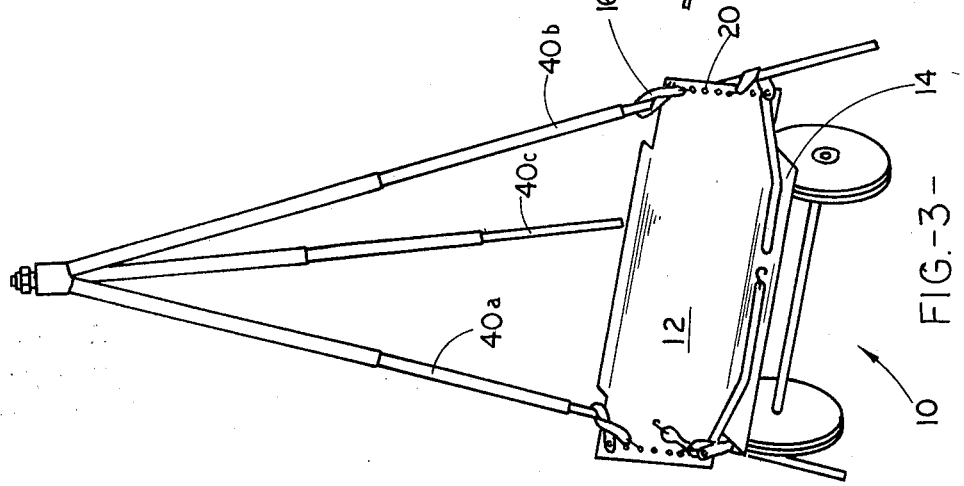
FIG.-3-

3,826,513

TRIPOD CARRIER

BACKGROUND OF THE INVENTION

Expert photographers and camera enthusiasts frequently carry auxiliary equipment and a tripod in an effort to improve the quality of the photographs they produce. When photography is done away from the home or studio, this requires that the auxiliary equipment and tripod be transported manually. This can become quite burdensome and cumbersome, with a considerable risk of damage to expensive filters, light meters and the like.

OBJECTS OF THE INVENTION

It is an object of this invention to provide a device to increase the ease of mobility of a tripod.

It is a further object of this invention to provide a device for supporting auxiliary photograph equipment wherein it is readily accessible to the photographer.

It is a further object of this invention to provide a device for safely supporting a container for auxiliary equipment while the contents are readily accessible.

It is a further object of this invention to provide a device carrier for converting a tripod into a carriage for auxiliary equipment, as well as the tripod itself.

Other objects and advantages of this invention will become apparent from the description to follow, particularly when read in conjunction with the accompanying drawings.

SUMMARY OF THE INVENTION

In carrying out this invention, I provide a panel member of relatively rigid material such as plastic, sheet metal, or the like of sufficient width to span a pair of legs of a tripod when in its erected position. Brackets on the back of the panel rotatably support an axle on the ends of which are carried rubber tired wheels. Straps of an elastic material which are carried on the panel adjacent to sides thereof are wrapped tightly around each of the pair of the legs of the tripod to which the panel is to be secured with the support wheels elevated slightly above the surface upon which the erected tripod is supported. Hooks on the ends of the strap engage in holes along the sides of the panel whereby the straps may be readily unhooked for removal of the panel as desired. With the wheels spaced above the supporting surface, the tripod may be used in the customary manner for support of the camera without impeding the photographer in any manner. A shelf extending from the bottom of the panel can support a bag or other container for auxiliary camera equipment and another pair of straps carried on the sides of the panel may be secured around the bag to hold it in place. When it is desired to move the camera and tripod, the third leg may be lifted free of the ground and releasibly secured to the panel. Then the tripod may be tilted back onto the wheels and transported in the nature of a pull cart, with or without the camera in place.

BRIEF DESCRIPTION OF THE DRAWINGS

In the drawings:

FIG. 1 is an isometric view of the camera tripod transport embodying features of this invention;

FIG. 2 is an isometric view of the camera tripod transport with a tripod secured thereon and conditioned for mobility;

FIG. 3 is an isometric view of the camera tripod transport with the tripod conditioned for photographic use;

FIG. 4 is a side elevation view of the camera tripod transport in position; and

FIG. 5 is a rear elevation view of the camera tripod transport in position.

DESCRIPTION OF THE PREFERRED EMBODIMENT

Referring to FIG. 1 with greater particularity, the camera tripod transport 10 of this device comprises a relatively rigid panel 12 of metal, plastic or the like including a forwardly extending bottom platform 14 which is preferably integral therewith. The platform 14 may be used as a support for articles as will hereinafter be described, and in addition, adds rigidity to the panel 12. A pair of stretchable straps 16 are secured to each side edge of the panel, as by means of screws 18. The straps 16 are of an elastic material and carry hooks 19 at the distal ends thereof for engagement in selected ones of a series of holes 20 along each edge of the panel 12. The straps are preferably of a narrower width along their midportions to facilitate stretching. Along either side edge of the panel 12, a fifth elastic strap 46 may be secured for a purpose to be hereinafter described. Also secured to the opposite panel edges on the screws 18 are equipment restraining straps 21 and 22 having complementary attaching devices such as the hook and eyelets shown.

A pair of wheels 28 with rubber tires 30 are mounted on an axle 32 which, in turn, is rotatably mounted between brackets 34 which are bolted at 36 or otherwise secured to the panel 12. Hence, the panel may be rolled along any surface on which it may be supported.

Referring now to FIGS. 2 to 5, the camera tripod transport 10 is shown with a camera tripod 38 carried thereon. This is accomplished by placing the panel 12 flat against two of the tripod legs 40a and 40b, the panel 12 being wide enough to span the two legs while the legs 40a and 40b are in their normal positions of use. While the panel is so held, with the wheels 28 elevated slightly above the surface on which the tripod 38 is supported, the elastic straps 16 are wrapped tightly around the legs 40a and 40b and the hooks 19 are inserted in selected ones of the openings 20 along the panel edges. The plurality of openings 20 enable adjustment of the straps 19 to the circumference of the tripod legs 40a and 40b whereby the straps 16 firmly grip the tripod legs 40a and 40b under tension and the frictional engagement between the straps 16 and the legs hold the panel 12 in its slightly elevated position. This enables the free use of the transport for photographic purposes, with the tripod 38 supported on its three legs 40a, 40b, and 40c in customary fashion without interference from the transport carrier 10.

In fact, the transport 10 serves the convenience of the photographer in that it provides a convenient platform 14 to support a camera equipment bag B or the like, which is held in place by means of the restraining straps 21 and 22, with a suspension strap 42 secured between the equipment bag shoulder strap S and the tripod body 44 to hold the shoulder strap up and out of the way. Hence, there is no need for the photographer to struggle with the equipment bag B while he is trying to manage his tripod 38 and camera (not shown). The platform 14 renders the bag readily accessible for flash bulbs, light meters and like equipment conventionally carried therein.

When it is desired to move the camera and tripod 38 to another location, the third leg 40c may simply be pivoted up alongside the panel 12 and the fifth strap 19 is wrapped around it and inserted through one of the side edge openings 20. Then, by tilting the tripod 38 back slightly, with or without removing the camera, the tripod is supported on the wheels 38 of the transport 10, wherein it may be moved from one place to the next. When another photographing site is reached, the tripod 38 is merely held in place while the third leg is released and pivoted back to its normal position shown in FIGS. 3 to 5, and photographing continues. In fact, photographs may be taken without releasing the third leg simply by steadying the tripod by hand.

While this invention has been described in conjunction with a preferred embodiment thereof, it is obvious that modifications and changes therein may be made by those skilled in the art without departing from the spirit and scope of this invention.

What is claimed is:

1. A tripod and equipment transport comprising:
 a relatively rigid panel of a width sufficient to span a pair of legs of an erected tripod;
 a wheel support member carried on said panel;
 a wheel rotatably carried on said support member;
 means on said panel for releasably securing it to said pair of legs with said wheel above a surface on which said tripod is supported when erected; and means on said panel for retaining the third leg of said tripod above a surface on which said panel is supported on said wheel.

2. The tripod and equipment transport defined by claim 1 including:
 an equipment support shelf extending from the lower portion of said panel.

3. The tripod and equipment transport defined by claim 2 including:
 releasable restraining means on said panel for embracing an article on said support shelf.

4. The tripod and equipment transport defined by claim 1 wherein:
 the means for securing said panel to a pair of tripod legs comprises straps one end of which is secured adjacent the sides of said panel.

5. The tripod and equipment transport defined by claim 4 wherein:
 said straps are of an elastic material.

6. The tripod and equipment transport defined by claim 5 including:
 means for securing said straps to said panel adjacent the sides of said panel;
 a plurality of holes along the sides of said panel; and hooks on the other end of said straps for engaging selected ones of said holes.

* * * * *